United States Patent [19]
Waller

[11] Patent Number: 5,911,289
[45] Date of Patent: Jun. 15, 1999

[54] OIL LEVEL CONTROL APPARATUS

[76] Inventor: Clive Gregory Waller, 56 Melville Parade, South Perth, Western Australia 6151, Australia

[21] Appl. No.: 08/750,878
[22] PCT Filed: Jun. 16, 1995
[86] PCT No.: PCT/AU95/00354
  § 371 Date: May 15, 1997
  § 102(e) Date: May 15, 1997
[87] PCT Pub. No.: WO95/35462
  PCT Pub. Date: Dec. 28, 1995

[30] Foreign Application Priority Data

Jun. 17, 1994 [AU] Australia .............................. PM 6300

[51] Int. Cl.⁶ .................................................. F01M 11/12
[52] U.S. Cl. ........................ 184/103.2; 184/6.4; 184/108; 62/84; 62/468
[58] Field of Search ................... 184/6.4, 103.1, 184/103.2, 108; 62/84, 468

[56] References Cited

U.S. PATENT DOCUMENTS

| | | | |
|---|---|---|---|
| 2,246,244 | 6/1941 | Consley .................................... | 62/468 |
| 2,671,529 | 3/1954 | Hungerford . | |
| 2,792,912 | 5/1957 | Kangas . | |
| 3,621,670 | 11/1971 | Kinney ..................................... | 62/468 |
| 4,428,208 | 1/1984 | Krause ................................. | 184/103.2 |
| 5,150,586 | 9/1992 | Basseggio ................................. | 62/468 |
| 5,273,134 | 12/1993 | Hegemier et al. . | |
| 5,327,997 | 7/1994 | Nash, Jr. et al. ......................... | 184/6.4 |

FOREIGN PATENT DOCUMENTS

| | | |
|---|---|---|
| 0638708A1 | 7/1994 | European Pat. Off. . |
| 2113809 | 1/1982 | United Kingdom . |

*Primary Examiner*—Thomas E. Denion
*Attorney, Agent, or Firm*—Merchant, Gould, Smith, Edell, Welter & Schmidt, P.A.

[57] ABSTRACT

An apparatus (38) is disclosed for controlling the level of oil in one or more compressors (10) of a refrigeration system. The compressors (10) are supplied with oil from a reservoir (28) which is in fluid communication via a common conduit (32) and second conduit (98) with the oil sump (not shown) of each compressor (10). The apparatus (38) includes a housing composed of a main body portion and a spacer block. The body portion is provided with a chamber which houses a float. The chamber is in fluid communication with the oil sump of its respective compressor (10). As the oil level within the compressor (10) varies, the angle of pivot of float also varies. This variation is sensed by a sensor which produces a signal indicative of the level of the oil. When the signal is indicative that the level of oil within the compressor is below a first predetermined minimum level, solenoid valve (78) is opened and solenoid valve (82) closed. This allows oil from the reservoir (24) to flow via conduits (32 and 98) into the compressor. In another embodiment, if the signal is indicative that the oil level within the compressor is higher than a predetermined maximum level, solenoid valve (78) is caused to close and solenoid valve (82) caused to open resulting in oil being dumped from the compressor back to the oil reservoir (28) via conduits (98 and 32).

19 Claims, 4 Drawing Sheets

OIL LEVEL CONTROL APPARATUS

FIELD OF THE INVENTION

The present invention relates to an oil level control device with particular but not exclusive application to refrigeration systems.

BACKGROUND OF THE INVENTION

It is important to maintain the oil level of refrigeration compressors or like devices within a predetermined range in order to ensure efficient operation of the refrigeration system as well as preventing damage to the compressors. If the oil level in a compressor sump falls below a predetermined minimum level the compressor is automatically shut down to avoid or at least minimise damage created by the contact of unlubricated parts. Should the oil level in the compressor sump be above a predetermined maximum level, then large amounts of oil will be discharged with compressed refrigerant. This reduces the efficiency of the refrigeration system due to the insulating effect of the oil. This also effectively reduces the amount of oil available for any other compressors in the refrigeration system which may ultimately lead to the oil levels in other compressors falling below the predetermined minimum level shutting those compressors down.

It is essentially unavoidable that losses of oil will occur due to the inherent characteristics of refrigeration compressors. As oil is splashed about by the moving parts within the compressor a small percentage of the oil will be entrained in the compressed refrigerant. In an efficient system, there will typically be approximately 3% oil in circulation in the system. Oil losses may also occur due to leaks within the compressor and/or other devices within the refrigeration system through which compressor oil is held or refrigerant carrying oil passes.

Oil which is pumped out by the compressor with compressed refrigerant eventually returns normally as a large dose (slug) in a compressor suction line which feeds refrigerant vapour to the compressor for compression. When the refrigeration system includes a plurality of compressors arranged in parallel the volume of oil returned as a slug can be relatively large. Typically the oil slug returns after a defrost, or during periods of high evaporator load. The oil slug may not be evenly shared between the compressors, furthermore, any compressor that is not running will not receive any of the oil in the slug as there is no flow in the suction line of that compressor. The net effect is that the oil level in one or more of the compressors can exceed the predetermined maximum oil level while an oil reservoir of the refrigeration systems, designed to hold this oil is starved which in turn results in the starving of other compressors. It is not uncommon that the oil reservoir may be empty while some of the compressors are overfilled and others underfilled. The quick cure for this is to merely add more oil to the reservoir. This only serves to perpetuate the inefficiencies in the refrigeration system.

A system for controlling the oil level in the crank case or sump of a refrigeration compressor is described in U.S. Pat. No. 5,103,648 (AC & R Components, Inc) [ACR]. The ACR system uses a plurality of optical sensors to determine the oil level within the sump. Each sensor has an output which is connected to the input of a control circuit which operates to energise a solenoid valve to add oil to the sump from a remote source when the oil level in the sump as sensed is below a predetermined level. As an optional feature, the system can also produce an alarm in response to the sump being either overfilled or underfilled with oil.

An admitted deficiency in the ACR system is that the optical sensors may be effected by the presence of foam in the oil as a result of dissolved refrigerant boiling out of the oil. To overcome this problem ACR propose use of timing circuits to cycle solenoid valves between their opened and closed conditions to dissipate the foam for more accurate sensing of the actual oil level. ACR also apparently fail to recognise the problems that may occur when compressors are over filled.

SUMMARY OF THE INVENTION

It is an object of the present invention to provide an oil level control apparatus for a compressor in a refrigeration system which attempts to maintain the oil level with a predetermined range by adding oil to the compressor if the oil level drops below a predetermined minimum level and removing oil from the compressor if the oil level exceeds a predetermined maximum level.

It is a further object of the present invention to provide an oil level control apparatus for a compressor in a refrigeration system which attempts to maintain the oil level within a predetermined range by adding oil to the compressor if the oil level drops below a predetermined minimum level which overcomes the deficiencies associated with optical sensors.

According to one aspect of the present invention there is provided an oil level control apparatus for a compressor in a refrigeration system which includes an oil reservoir for holding a supply of oil and being in fluid communication with said compressor, said compressor having an oil pump and an oil sump, said apparatus comprising:

an oil level sensor in fluid communication with said compressor for producing a signal indicative of the level of oil within said compressor, said oil level sensor including a housing in which a chamber is formed, said housing adapted for attachment to a wall of said compressor and provided with a first duct for spacing, and providing fluid communication between, said compressor and said chamber, said first duct stabilising oil within said chamber so that the oil in said chamber is substantially stagnant;

a float member pivotally mounted in said chamber, and, a float position sensor for sensing the angle of pivoting of the float member and producing said signal;

control means for operating first and second valves, said first valve adapted for controlling fluid communication between said oil sump and said reservoir and said second valve adapted for controlling fluid communication between said oil pump and said oil reservoir;

wherein, when said signal is indicative of the oil level in said compressor being less than a first predetermined minimum level, said control means operates to open said first valve and close said second valve providing fluid communication between said sump and said reservoir so that oil from said oil reservoir can flow into said oil sump; when said signal is indicative of the oil level in the compressor being greater than a predetermined maximum level, said control means operates to open said second valve and close said first valve providing fluid communication between said oil pump and said oil reservoir so that said oil pump can pump oil from said sump to said oil reservoir; and, when said signal is indicative of the oil level being between said predetermined minimum and maximum levels, said control means operates to close both said first valve and said second valve to prevent oil flow between said compressor and reservoir via said first and second valves.

According to a second aspect of the present invention there is provided an oil level control apparatus for a compressor in a refrigeration system which includes an oil reservoir for holding a supply of oil and being in fluid communication with said compressor, said compressor having an oil pump and an oil sump, said apparatus comprising:

an oil level sensor in fluid communication with said compressor for producing a signal indicative of the level of oil within said compressor;

control means for operating first and second valves, said first valve adapted for controlling fluid communication between said oil sump and said reservoir and said second valve adapted for controlling fluid communication between said oil pump and said oil reservoir, said control means further including delayed alarm means;

wherein, when said signal is indicative of the oil level in said compressor being less than a first predetermined minimum level, said control means operates to open said first valve and close said second valve providing fluid communication between said sump and said reservoir so that oil from said oil reservoir can flow into said oil sump and in the event that after a predetermined time delay from the initial operation of said first valve, the oil level within said sump has not exceeded said first predetermined minimum level, said control means activates said delayed alarm means to provide an alarm indication; when said signal is indicative of the oil level in the compressor being greater than a predetermined maximum level, said control means operates to open said second valve and close said first valve providing fluid communication between said oil pump and said oil reservoir so that said oil pump can pump oil from said sump to said oil reservoir; and, when said signal is indicative of the oil level being between said predetermined minimum and maximum levels, said control means operates to close both said first valve and said second valve to prevent oil flow between said compressor and reservoir via said first and second valves.

Preferably in the second aspect said oil sensor comprises a float member pivotally mounted in a chamber, said chamber being in fluid communication with said oil sump; and, a float position sensor for sensing the angle of pivoting of the float member and producing said signal.

Preferably in the second aspect said apparatus comprises a housing in which said chamber is formed, said housing adapted for attachment to a wall of said compressor and provided with a first duct for spacing and providing fluid communication between said compressor and said chamber, said first duct stabilising oil within said chamber so that the oil in said chamber is substantially stagnant.

Preferably said housing is further provided with a second duct located above said first duct through which refrigerant vapour disassociating from said oil in said chamber can be returned to said compressor.

Preferably said housing comprises a main body portion containing said chamber and a spacer block in which said first and second ducts are formed, said spacer block attachable on one side to said main body portion and attachable on the opposite side to said compressor wall.

Preferably said main body portion houses said first and second valves and is provided with a first gallery communicating between said compressor and said reservoir in which both said first and second valves are disposed, said first gallery providing a common feedline for said reservoir and oil pump to and from said compressor, and, a second gallery communicating between said second valve and said oil pump whereby, in use, when said first valve is open and said second valve is closed, said first gallery allows oil to flow from said oil reservoir to said compressor and, when said second valve is opened and said first valve is closed, oil from said oil pump can flow to said oil reservoir via said second gallery.

Preferably said main body portion is provided with a check valve upstream of said second gallery to prevent flow of refrigerant vapour to said oil pump during compressor off cycle.

Preferably said main body portion further comprises a restrictor upstream of said check valve to prevent substantial drop of oil pressure in said compressor when oil is being pumped from said compressor to said oil reservoir.

According to a third aspect of the present invention there is provided an oil level control device for a compressor in a refrigeration system which includes an oil reservoir for holding a supply of oil and being in fluid communication with said compressor, said compressor having an oil pump and an oil sump, said apparatus comprising:

an oil level sensor in fluid communication with said compressor, said oil level sensor comprising a housing in which a chamber is formed, said housing adapted for attachment to a wall of said compressor and provided with a first duct for spacing and providing fluid communication between said compressor and said chamber, said first duct stabilising oil within said chamber so that the oil in said chamber is substantially stagnant; and a second duct located above said first duct through which refrigerant vapour disassociating from said oil in said chamber can be returned to said compressor;

a float member pivotally mounted in said chamber in fluid communication with said oil sump;

a float position sensor for sensing the angle of pivoting of said float member and producing a signal indicative of the oil level within said compressor; and, control means for operating a valve adapted for controlling fluid communication between said oil sump and said reservoir;

wherein, when said signal is indicative of the oil level in said oil sump being less than a predetermined minimum level, said control means operates to open said valve so that oil from said oil reservoir can flow into said oil sump to increase the oil level within said sump to above said predetermined minimum level.

According to a fourth aspect of the present invention there is provided an oil level control device for a compressor in a refrigeration system which includes an oil reservoir for holding a supply of oil and being in fluid communication with said compressor, said compressor having an oil pump and an oil sump, said apparatus comprising:

an oil level sensor in fluid communication with said compressor, said oil level sensor comprising a float member pivotally mounted in a chamber in fluid communication with said oil sump and a float position sensor for sensing the angle of pivoting of said float member and producing a signal indicative of the oil level within said compressor; and, control means for operating a valve adapted for controlling fluid communication between said oil sump and said reservoir, said control means including a delayed alarm means;

wherein, when said signal is indicative of the oil level in said oil sump being less than a predetermined minimum level, said control means operates to open said valve so that oil from said oil reservoir can flow into said oil sump to increase the oil level within said sump to above said predetermined minimum level, and in the event that after a predetermined time delay from the initial operation of said first valve, the oil level within said sump has not exceeded said first predetermined minimum level, said delayed alarm means is activated to produce an alarm indication.

Preferably in the fourth aspect said apparatus comprises a housing in which said chamber is formed, said housing adapted for attachment to a wall of said compressor and provided with a first duct for spacing and providing said fluid communication between said oil sump and said chamber, said first duct stabilising oil which flows between said chamber and said sump so that the oil in said chamber is substantially stagnant.

Preferably in the fourth aspect said housing further comprises a second duct disposed above said first duct through which refrigerant vapour disassociating from said oil in said chamber can be returned to said compressor.

Preferably in the first and third aspects said control means includes a delayed alarm means for providing an alarm indication in the event that said valve is opened to allow oil to flow from said reservoir to said sump and, after a predetermined time delay from the initial operation of said valve, the oil level within said sump has not exceeded said first predetermined minimum level.

BRIEF DESCRIPTION OF THE DRAWINGS

Embodiments of the present invention will now be described by way of example only, with reference to the accompanying drawings in which.

DETAILED DESCRIPTION OF THE PREFERRED EMBODIMENTS

Figure 1:
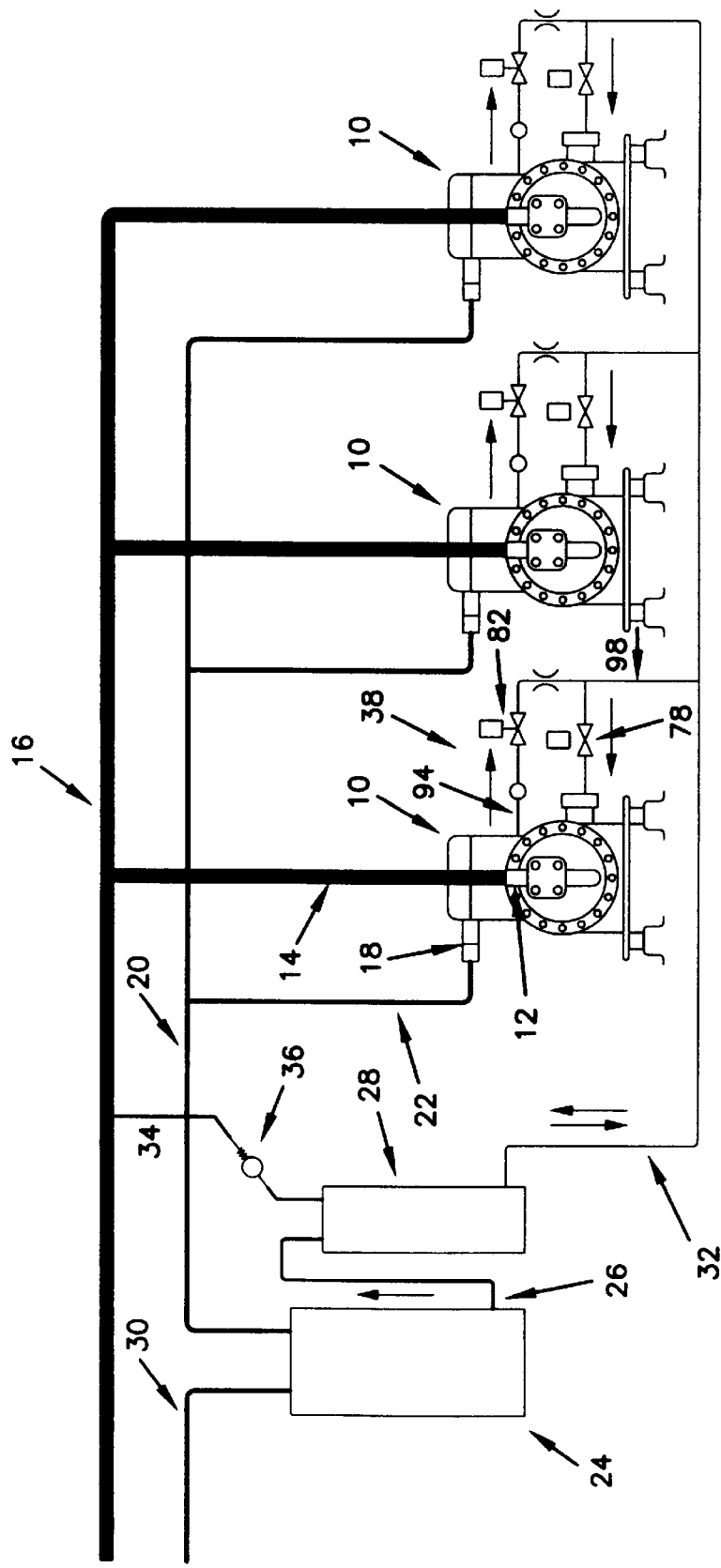
FIG. 1 is a representation of a refrigeration system in which the oil control apparatus is used.

FIG. 1 illustrates a typical refrigeration system in which the present invention can be used. The refrigeration system comprises three parallel connected compressors 10. Each compressor is provided with a sump (not shown) for holding a supply of oil and an oil pump (not shown) for pumping that oil for sealing and lubrication. Inlet 12 of each compressor is connected via conduit 14 to a common suction header 16. The suction header 16 receives refrigerant vapour from the refrigeration system evaporators (not shown). The refrigerant vapour is compressed by the compressors 12 and forced out of compressor outlet 18. The outlet 18 of each compressor is connected to a common discharge header 20 via conduits 22. The discharge header 20 carries compressed refrigerant vapour to oil separator 24. The function of the oil separator is to separate any oil which may be contained in the refrigerant. The oil separator 24 includes a float (not shown) which opens a valve when buoyed by the oil separated from the refrigerant contained therein. Upon opening of the valve the oil then passes via conduit 26 to oil reservoir 28. Refrigerant within the oil separator passes via a conduit 30 to the condensers (not shown) of the refrigeration system.

Notwithstanding the inclusion of oil separator 24 a small proportion of oil is still contained in the refrigerant flowing to the condensers through conduit 30 as no oil separator is 100% efficient.

Oil reservoir 28 communicates via conduit 32 with the compressors 12. Reservoir 28 also communicates with the common suction header 16 via conduit 34 in which is disposed a differential check valve 36. The oil within oil reservoir 28 is typically rich in dissolved refrigerant. The refrigerant boils out of the oil due to a drop in pressure as it leaves the oil separator 24. As the refrigerant boils out of the oil there is an increase in the pressure within the oil reservoir 28. This pressure is maintained at a predetermined value, typically 15 psi, above the oil pressure in the compressor sumps by the differential check valve 36. When the vapour pressure within oil reservoir 28 exceeds 15 psi above the sump oil pressure it is vented to the common suction header and thus returned to the compressors 12.

An apparatus 38 for controlling the oil level in any one of the compressors 12 communicates between the compressors 12 and the oil reservoir 28.

Figures 2, 3:
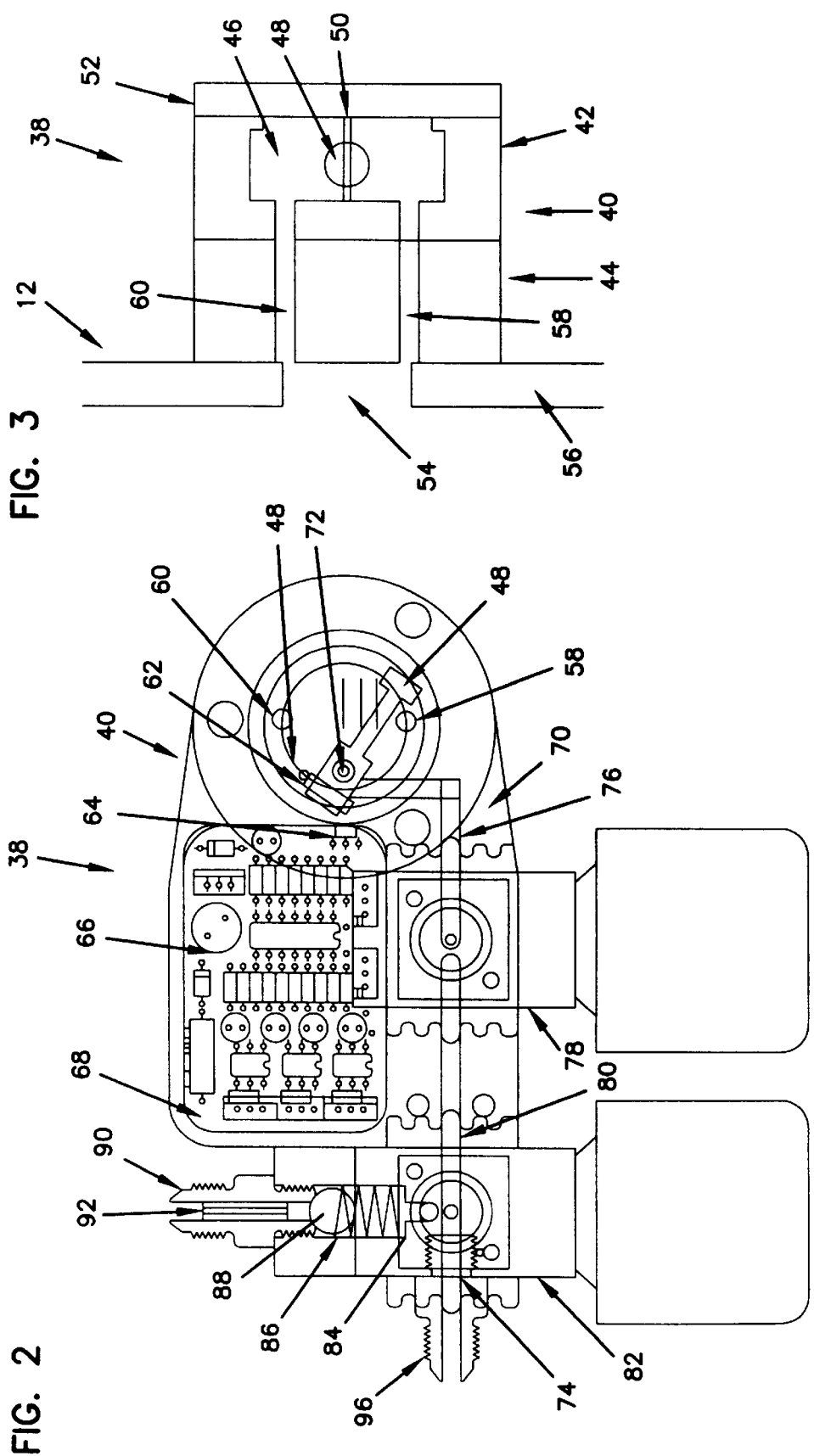
FIG. 2 is a schematic representation of the oil control apparatus.
FIG. 3 is a partial end view of the oil control apparatus attached to a refrigeration compressor.

FIGS. 2 and 3 illustrate one form of the apparatus 38 for use in situations where it is desired to both add oil to and dump oil from the compressor sumps. The apparatus 38 comprises a housing 40 composed of a main body portion 42 and a spacer block 44. Body portion 42 is provided with a chamber 46 which houses float 48 which pivots on a transversely extending pin 50. Chamber 46 is closed at one end by sight glass 52. An opposite side of the chamber 46 is attached to one side of the spacer block 44 and the opposite side of the spacer block 44 is attached to the compressor 12 over an opening 54 in compressor wall 56. The opening 54 directly communicates with the compressor sump. Lower and upper oil ducts 58 and 60 are formed in spacer 44 and provide fluid communication between chamber 46 and the compressor sump. The device 38 is attached to the compressor 12 at a position so that pin 50 is at a height corresponding to the optimum oil level in the compressor sump.

The float 48 is made in accordance with the teachings of the applicant's corresponding International application no. PCT/AU91/00386 (WO 92/03718). Specifically, a magnet 62 is carried by one end of the float 48 for activating a hall sensor 64 connected in a circuit board 66 housed within a cavity 68 formed in main body portion 42. As explained in greater detail hereinafter Hall sensor 64 acts as a float position sensor for sensing the angle of pivoting of float 48 and in turn providing a signal indicative of the level of oil within chamber 46 and compressor sump.

A first oil gallery 70 is formed in the body portion 42 which communicates at one end 72 with the compressor sump and at an opposite end 74 with conduit 32 for communicating with oil reservoir 28. The first gallery 70 is composed of an first length 76 extending from end 72 to a first solenoid valve 78 and a second length 80 which extends from the first valve 78 to end 74. Second solenoid valve 82 is disposed in the second length 80.

A second oil gallery 84 was coupled to solenoid valve 82 for selective communication with the first gallery 70. An opposite end of the second gallery 84 leads to a chamber 86 in the main body 42 which houses a check valve 88 and to which is coupled a conduit fitting 90 provided with an internal restrictor 92. The fitting 90 is in turn coupled to a conduit 94 (refer FIG. 1) for communicating with the oil pump of compressor 12. A fitting 96 is also attached to the main body portion communicating with end 74 of the first gallery 70 for coupling to conduit 98 (refer FIG. 1) which in turn is connected with the conduit 32 leading to the oil reservoir 28.

Figure 4:
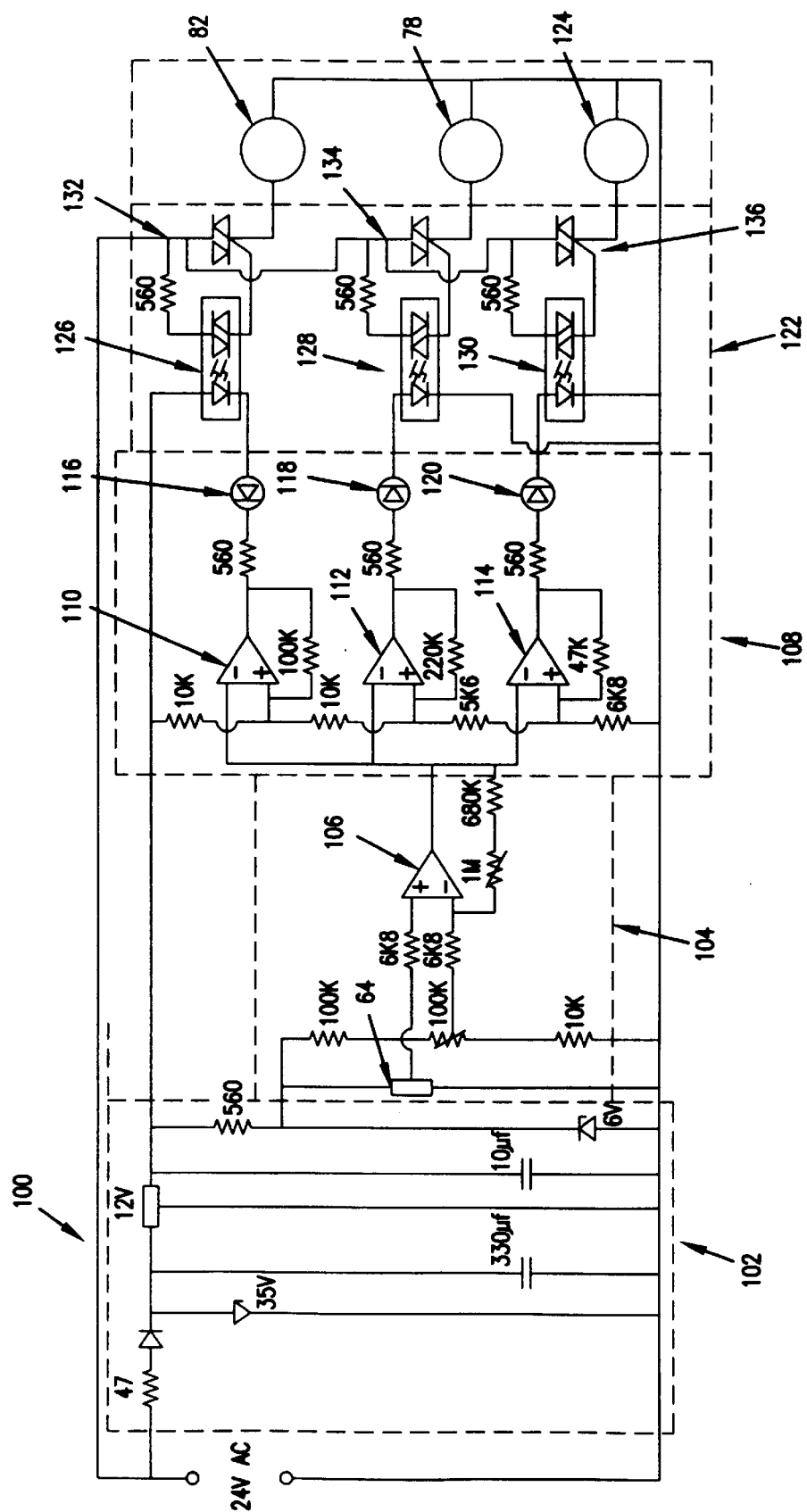
FIG. 4 is a circuit diagram of an electronic control circuit for the oil control apparatus; and, FIG. 5 is a circuit diagram of an alternate electronic control circuit for the oil level control apparatus.

One form of the control circuit 100 for the apparatus 38 mounted on circuit board 66 is represented in FIG. 4. The control circuit comprises a number of standard circuit blocks which are well known in the art and will therefore not be discussed in great detail.

Typically, refrigeration control systems operate from a 24 volt A.C supply. Accordingly the control circuit 100 is designed to be powered from such a supply. The front end of the circuit includes a voltage regulator circuit 102 which provides a constant DC output for sensor circuit 104.

The sensor circuit 104 includes Hall sensor 64 the output signal of which varies depending upon the position of the magnet 62 and thus the pivot angle of the float 48. The signal produced by the Hall signal 64 is thus indicative of the oil level within the chamber 48 and compressor sump. The signal is amplified by op amp 106 which produces an output typically in the range of 2 to 10 volts which is fed to a comparative circuit 108.

The comparative circuit includes three separate comparators 110, 112 and 114 which produce a high or low output depending on the output of op amp 106. Typically, the comparators 110, 112 and 114 are set to produce a high output when the output voltage from op amp 106 is greater than 8 volts, 6 volts and 4 volts respectively. LED status indicators 116, 118 and 120 are coupled to the outputs of the comparators 110, 112, 114 respectively to provide a visual indication as to which of these comparators are producing a high output and consequently the level of the oil in the compressor sump. The comparative circuit 108 drives a switching circuit 122 for controlling solenoid valves 78 and 82 and an alarm relay 124. (The low alarm relay 124 is not shown in FIG. 2).

Switching circuit 122 comprises optical isolators 126, 128 and 130 having their inputs connected with the outputs of comparators 110, 112 and 114 respectively, and having their inputs connected with triacs 132, 134 and 136 respectively. The triacs in turn supply energising current to relays 78, 82 and 124.

The operation of the apparatus 38 will now be described.

A single apparatus 38 is connected with each of the compressors 12. A sight glass is always provided in the compressor wall 56 to allow visual inspection of the oil level within the compressor sump. The sight glass (not shown) is removed and the housing 40 bolted over the opening 54 in the compressor wall 56 previously covered by the sight glass. Conduit 98 is connected between the fitting 96 and conduit 32. Conduit 94 is connected between fitting 90 and the internal oil pump of the compressor 12.

Oil within the compressor sump passes into the chamber 46 via at least duct 58 formed in the spacer 44. The oil within the sump may contain dissolved refrigerant. The duct 58 is designed to stabilise the oil within chamber 46 so that it is substantially unaffected by the movement of the oil in the compressor sump. In addition, the ducts 58 provide an area within which foaming can occur, that is the boiling out of dissolved refrigerant. This also assists to stabilise the oil within the chamber 46. Refrigerant vapour generated during foaming can return to the compressor either via the end of duct 58 adjacent the compressor wall 56 or through duct 60. In any event due to the structure of the float 48, the movement of the float is substantially unaffected by foaming even in the absence of ducts 58 and 60.

The Hall sensor 64 produces an output signal the level of which is dependant on the proximity of magnet 62 to the Hall sensor 64. As the oil level within chamber 46 changes the angle of pivot of the float 48 also changes providing a variation in the output of the hole sensor 64. Depending on the level of the output at most one of the comparators 110, 112 or 114 will produce a high output for switching solenoid valves 78, 82 or low alarm relay 124.

If the level of the oil within the chamber 46 and thus sump compressor is lower than a first predetermined minimum level, comparator 112 energises and opens solenoid valve 78 while comparator 110 which produces a low output maintains solenoid valve 82 shut. Accordingly fluid communication is provided across valve 78 between the first and second lengths 76, 80 of the first gallery 70 thereby providing a fluid path from reservoir 28 via conduits 32 and 98, and gallery 70 to the compressor sump so that oil form the oil reservoir 28 can fill the compressor sump. This is a natural flow of oil due to the pressure differential between the oil within reservoir 28 and the compressor 12.

This pressure differential is provided by the differential check valve 36. As the solenoid valve 82 is not energised communication between the first gallery 70 and second gallery 84 is blocked preventing flow of oil between the compressor oil pump and the first gallery 70.

As the oil level within the compressor sump and fluid chamber 46 increases the float 48 pivots changing the spatial relationship between magnet 62 and Hall sensor 64 and accordingly changing the output signal strength of the hole sensor 64. Eventually the signal strength is of such a level that the comparator 112 is switched to produce a low output therefore closing solenoid valve 78. Oil flow from the reservoir 28 to the compressor 12 is then blocked preventing overfilling of the compressor 12.

Should the oil level within the compressor sump increase beyond a predetermined maximum level, typically by the return of a oil slug after a defrost the pivotal position of float 48 will again change so that magnet 62 is in relatively close proximity to Hall sensor 64. The sensor circuit 104 will in this condition provide a relatively high output which will produce a high output on comparator 110 and low outputs on comparators 112 and 114. Accordingly switching circuit 112 operates to activate and open solenoid valve 82 while maintaining solenoid valve 78 shut.

A flow path now exists between the oil pump of the compressor 12 and the oil reservoir 28 via conduit 94, second oil gallery 84, second length 80 of the first oil gallery 70, conduit 98 and conduit 32. The oil pump of the compressor 12 is normally of a capacity such as to be able to return oil from the compressor 12 to the oil reservoir 32 notwithstanding the higher pressure level in the reservoir 28.

The restrictor 92 is incorporated to ensure that oil is not removed too quickly from the compressor 12 resulting in loss of compressor oil pressure. The check valve 88 is fitted to ensure that should the oil reservoir 28 ever run out of oil and be filled solely with refrigerant vapour that vapour cannot enter the oil pump causing a vapour lock when solenoid valve 82 is open for removing oil form the compressor whilst the compressor may be stopped.

Should the oil level within the sump drop to a second predetermined minimum level below the first minimum level the sensor circuit 104 produces an output signal which in turn produces a high output on comparator 114 and low outputs on comparators 112 and 110. Switching circuit 112 accordingly operates to activate the low alarm relay 124 while deenergizing and maintaining closed solenoid valves 78 and 82. Typically the oil level may be below the second predetermined minimum level in the event of a major leak in one of the components which hold or carry the oil such as for example the reservoir 28 or ducts 32 or 94.

From the above description it can be seen that the present apparatus 38 is able to maintain the oil level within a compressor 12 between a predetermined minimum and maximum level. In the event that the oil level drops to below the minimum level oil is added to the compressor from oil reservoir 28. In the event that the oil level exceeds the predetermined maximum level oil is returned from the compressor 12 to the reservoir 28. Thus, in a start up condition where an oil slug can return to one or more of the compressors thereby overfilling those compressors while compressors have an oil level below the predetermined minimum level the device 10 operates to equalise the oil levels by pumping oil from the overfilled compressors to reservoir 28 and allowing oil to flow from reservoir 28 to the underfilled compressors.

Figure 5:
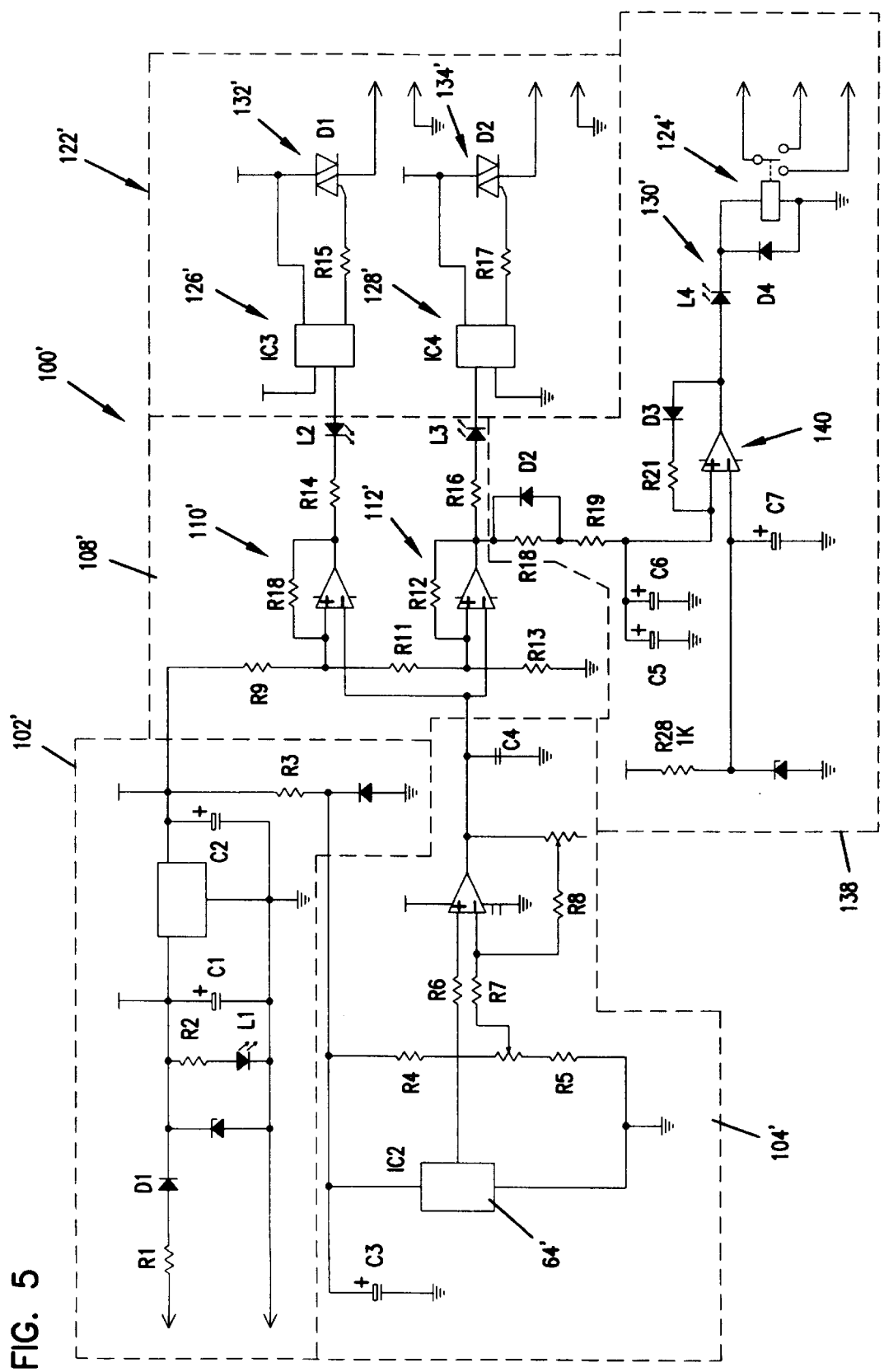

An alternative control circuit 100' is shown in FIG. 5. This circuit 100' also comprises a number of standard circuit blocks which individually are well known in the art and therefore will not be discussed in detail. The reference numbers used for each of the circuit blocks in circuit 100' which function in substantially the same manner as corresponding blocks in circuit 100 are designated by the same reference number as used in the description relating to circuit 100 but with the inclusion of a "prime" mark. For example the voltage regulator circuit of the control circuit 100' is designated as circuit block 102'.

Circuit 100' is very similar to circuit 100 and in substance differs only in the configuration and function of the alarm circuitry which in circuit 100 is composed of comparator 114, LED 120, optical isolator 130, triac 136, and low alarm relay 124. In circuit 100, an alarm is produced whenever the oil level within a compressor sump falls below a second predetermined minimum level. However, in circuit 100', a delayed alarm circuit 138 is provided with produces an alarm only if, after a predetermined period of time has elapsed from the energising of solenoid valves 78, the level of oil within the compressor sump is still sensed to be below the first minimum level. That is, when the sensor circuit 104' produces an output commensurate with the oil level in a compressor sump being less than a first predetermined minimum level, comparator 110' produces a low output and comparator 112' produces a high output. The low output from comparator 110' maintains triac 132' in an OFF state and consequently holds valve 82 shut. The high output on comparator 112' turns ON triac 134' opening the solenoid valve 78 so that oil may flow from the oil reservoir to the compressor sump. Simultaneously, the high output on comparator 112' initiates the functioning of the delayed alarm circuit 138. The circuit 138 is designed to operate so that if the output at comparator 112' maintains in a high state for a period of two minutes an alarm LED 130' and alarm relay 134' are activated, the alarm relay 134' controlling an audible and/or other types of alarms. Accordingly, the delayed alarm circuit 138 only activates an alarm if the oil level within a compressor sump has not returned to above the first predetermined level after the lapsing of a two minute period from the initial activation of the valve 78. In normal conditions, once valve 78 is activated, it would normally take between 15 to 30 seconds for the oil level within a compressor sump to exceed the first predetermined level. The delayed alarm circuit 138 attempts to discriminate between serious problems in the refrigeration system 10 caused by a major leak in for example, the reservoir 28 or ducts 32 or 94; and normal operational occurrences where the oil level within the sump may be maintained below a second predetermined level for a short period of time such on initial start up of the refrigeration system 10.

In a further embodiment of the present invention, the apparatus 38 may be used solely to control the filling of compressor sumps in the event that the level of oil within the sumps falls below a predetermined level. Such an apparatus 38 would be in essence identical to that shown in FIG. 2 with the exception of the removal of solenoid valve 82, second gallery 84, chamber 86, check valve 88 and conduit 90. The associated circuity for operating valve 82 would also not be required. Fitting 96 would remain and be in direct fluid communication with the oil gallery 70.

Accordingly, in this embodiment the apparatus 38 would act solely to fill the oil sumps of compressors but would not be able to dump oil in the event that the oil level exceeded a certain level. The form, function and operation of the float 48 and chamber 46 is the same as illustrated and described with reference to FIGS. 2 and 3. Additionally, the control circuit may be in general accordance with either circuits 100 or 100' so as to produce an alarm when the level of oil within the compressor sump falls below a second minimum level, or when the time taken for the oil level to increase above the first predetermined minimum level exceeds a predetermined time period, respectively.

Now that embodiments of the present invention have been described in detail it will be apparent to those of ordinary skill in the relevant arts that numerous modifications and variations may be made without departing from the basic inventive concepts. For example any control circuit 100 can be used which can distinguish between different levels of outputs from a sensor used for sensing the oil level within the compressors 12. In addition the device 10 can be interfaced with a computer having the output from sensor circuit 104 for providing automatic logging of oil levels within the compressors 12 and refrigeration system as a whole. All such modifications and variations are deemed to be within the scope of the present invention the nature of which is to be determined from the above description.

I claim:

1. An oil level control apparatus for a compressor in a refrigeration system which includes an oil reservoir for holding a supply of oil and being in fluid communication with said compressor, said compressor having an oil pump and an oil sump, said apparatus comprising:

an oil level sensor in fluid communication with said compressor for producing a signal indicative of the level of oil within said compressor, said oil level sensor including a housing in which a chamber is formed, said housing adapted for attachment to a wall of said compressor and having separate first and second ducts, said first duct for spacing, and providing fluid communication between, said compressor and said chamber, and acting to stabilize oil within said chamber so that the oil in said chamber is substantially stagnant, and said second duct located above said first duct and providing a path through which refrigerant vapour disassociating from the oil in the chamber can return to said compressor;

a float member pivotally mounted in said chamber, and a float position sensor for sensing the angle of pivoting of the float member and producing said signal;

control means for operating first and second valves, said first valve adapted for controlling fluid communication between said oil sump and said reservoir and said second valve adapted for controlling fluid communication between said oil pump and said oil reservoir; and wherein, when said signal is indicative of the oil level in said compressor being less than a first predetermined minimum level, said control means operates to open said first valve and close said second valve providing fluid communication between said sump and said reservoir so that oil from said oil reservoir can flow into said oil sump; when said signal is indicative of the oil level in the compressor being greater than a predetermined maximum level, said control means operates to open said second valve and close said first valve providing fluid communication between said oil pump and said oil reservoir so that said oil pump can pump oil from said sump to said oil reservoir; and, when said signal is indicative of the oil level being between said predetermined minimum and maximum levels, said control means operates to close both said first valve and said second valve to prevent oil flow between said compressor and reservoir via said first and second valves.

2. An oil level control apparatus according to claim 1, wherein said housing comprises a main body portion containing said chamber and a spacer block in which said first and second ducts are formed, said spacer block attachable on one side to said main body portion and attachable on the opposite side to said compressor wall.

3. An oil level control apparatus according to claim 2, wherein said main body portion houses said first and second valves and is provided with a first gallery communicating between said compressor and said reservoir in which both said first and second valves are disposed, said first gallery providing a common feedline for said reservoir and oil pump to and from said compressor, and, a second gallery communicating between said second valve and said oil pump whereby, in use, when said first valve is open and said second valve is closed, said first gallery allows oil to flow from said oil reservoir to said compressor and, when said second valve is opened and said first valve is closed, oil from said oil pump can flow to said oil reservoir via said second gallery.

4. An oil level control apparatus according to claim 3, wherein said main body portion is provided with a check valve upstream of said second gallery to prevent flow of refrigerant vapour to said oil pump during compressor off cycle.

5. An oil level control apparatus according to claim 4, wherein said main body portion further comprises a restrictor upstream of said check valve to prevent substantial drop of oil pressure in said compressor when oil is being pumped from said compressor to said oil reservoir.

6. An oil level control apparatus according to claim 1, wherein said control means further comprises an alarm circuit adapted to provide an alarm when the said signal is indicative of the oil level in said compressor being less than a second predetermined minimum level, said second predetermined minimum level being below said first predetermined minimum level.

7. An oil level control apparatus according to claim 1, wherein said control means includes a delayed alarm means for providing an alarm indication in the event that said first valve is opened to allow oil to flow from said reservoir to said sump and, after a predetermined time delay from the initial operation of said first valve, the oil level within said sump has not exceeded said first predetermined minimum level.

8. An oil level control device for a compressor in a refrigeration system which includes an oil reservoir for holding a supply of oil and being in fluid communication with said compressor, said compressor having an oil pump and an oil sump, said apparatus comprising:

an oil level sensor in fluid communication with said compressor, said oil level sensor comprising a housing in which a chamber is formed, said housing adapted for attachment to a wall of said compressor and provided with a first duct for spacing and providing fluid communication between said compressor and said chamber, said first duct stabilising oil within said chamber so that the oil in said chamber is substantially stagnant; and a second duct located above said first duct through which refrigerant vapour disassociating from said oil in said chamber can be returned to said compressor;

a float member pivotally mounted in said chamber in fluid communication with said oil sump;

a float position sensor for sensing the angle of pivoting of said float member and producing a signal indicative of the oil level within said compressor; and, control means for operating a valve adapted for controlling fluid communication between said oil sump and said reservoir;

wherein, when said signal is indicative of the oil level in said oil sump being less than a predetermined minimum level, said control means operates to open said valve so that oil from said oil reservoir can flow into said oil sump to increase the oil level within said sump to above said predetermined minimum level.

9. An oil level control apparatus according to claim 8, wherein said control means further comprises an alarm circuit adapted to provide an alarm when the said signal is indicative of the oil level in said compressor being less than a second predetermined minimum level, said second predetermined minimum level being below said first predetermined minimum level.

10. An oil level control apparatus according to claim 8, wherein said control means includes a delayed alarm means for providing an alarm indication in the event that said first valve is opened to allow oil to flow from said reservoir to said sump and, after a predetermined time delay from the initial operation of said first valve, the oil level within said sump has not exceeded said first predetermined minimum level.

11. An oil level control apparatus for a compressor in a refrigeration system which includes an oil reservoir for holding a supply of oil and being in fluid communication with said compressor, said compressor having an oil pump and an oil sump, said apparatus comprising:

an oil level sensor in fluid communication with said compressor for producing a signal indicative of the level of oil within said compressor;

control means for operating first and second valves, said first valve adapted for controlling fluid communication between said oil sump and said reservoir and said second valve adapted for controlling fluid communication between said oil pump and said oil reservoir, said control means further including delayed alarm means;

wherein, when said signal is indicative of the oil level in said compressor being less than a first predetermined minimum level, said control means operates to open said first valve and close said second valve providing fluid communication between said sump and said reservoir so that oil from said oil reservoir can flow into said oil sump and in the event that after a predetermined time delay from the initial operation of said first valve, the oil level within said sump has not exceeded said first predetermined minimum level, said control means activates said delayed alarm means to provide an alarm indication; when said signal is indicative of the oil level in the compressor being greater than a predetermined maximum level, said control means operates to open said second valve and close said first valve providing fluid communication between said oil pump and said oil reservoir so that said oil pump can pump oil from said sump to said oil reservoir; and, when said signal is indicative of the oil level being between said predetermined minimum and maximum levels, said control means operates to close both said first valve and said second valve to prevent oil flow between said compressor and reservoir via said first and second valves.

12. An oil level control apparatus according to claim 11, wherein said oil sensor comprises a float member pivotally mounted in a chamber, said chamber being in fluid communication with said oil sump; and, a float position sensor for sensing the angle of pivoting of the float member and producing said signal.

13. An oil level control apparatus according to claim 12, further comprising a housing in which said chamber is formed, said housing adapted for attachment to a wall of said compressor and provided with a first duct for spacing and providing fluid communication between said compressor and said chamber, said first duct stabilising oil within said chamber so that the oil in said chamber is substantially stagnant.

14. An oil level control apparatus according to claim 13, wherein said housing is further provided with a second duct located above said first duct through which refrigerant vapour disassociating from said oil in said chamber can be returned to said compressor.

15. An oil level control apparatus according to claim 14, wherein said housing comprises a main body portion containing said chamber and a spacer block in which said first and second ducts are formed, said spacer block attachable on one side to said main body portion and attachable on the opposite side to said compressor wall.

16. An oil level control apparatus according to claim 15, wherein said main body portion houses said first and second valves and is provided with a first gallery communicating between said compressor and said reservoir in which both said first and second valves are disposed, said first gallery providing a common feedline for said reservoir and oil pump to and from said compressor, and, a second gallery communicating between said second valve and said oil pump whereby, in use, when said first valve is open and said second valve is closed, said first gallery allows oil to flow from said oil reservoir to said compressor and, when said second valve is opened and said first valve is closed, oil from said oil pump can flow to said oil reservoir via said second gallery.

17. An oil level control apparatus according to claim 16, wherein said main body portion is provided with a check valve upstream of said second gallery to prevent flow of refrigerant vapour to said oil pump during compressor off cycle.

18. An oil level control apparatus according to claim 17, wherein said main body portion further comprises a restrictor upstream of said check valve to prevent substantial drop of oil pressure in said compressor when oil is being pumped from said compressor to said oil reservoir.

19. An oil level control device for a compressor in a refrigeration system which includes an oil reservoir for holding a supply of oil and being in fluid communication with said compressor, said compressor having an oil pump and an oil sump, said apparatus comprising:

an oil level sensor in fluid communication with said compressor, said oil level sensor including a housing in which a chamber is formed, said housing adapted for attachment to a wall of said compressor and having separate first and second ducts, said first duct for spacing, and providing fluid communication between, said compressor and said chamber, and acting to stabilize oil within said chamber so that the oil in said chamber is substantially stagnant, and said second duct located above said first duct and providing a path through which refrigerant vapour disassociating from the oil in said chamber can return to said compressor; a float member pivotally mounted in said chamber, and a float position sensor for sensing the angle of pivoting of said float member and producing a signal indicative of the oil level within said compressor;

control means for operating a valve adapted for controlling fluid communication between said oil sump and said reservoir, said control means including a delayed alarm means; and wherein, when said signal is indicative of the oil level in said oil sump being less than a predetermined minimum level, said control means operates to open said valve so that oil from said oil reservoir can flow into said oil sump to increase the oil level within said sump to above said predetermined minimum level, and in the event that after a predetermined time delay from the initial operation of said first valve, the oil level within said sump has not exceeded said first predetermined minimum level, said delayed alarm means is activated to produce an alarm indication.

\* \* \* \* \*